United States Patent [19]

Hamada et al.

[11] Patent Number: 5,409,978
[45] Date of Patent: Apr. 25, 1995

[54] METHOD FOR THE CONTINUOUS PREPARATION OF HEAT-VULCANIZING SILICONE RUBBER COMPOUNDS

[75] Inventors: Mitsuo Hamada, Chiba; Tomoo Kinoshita; Kaoru Kunimatsu, both of Fukui; Teruyuki Nakagawa, Chiba; Satoru Terashima, Fukui, all of Japan

[73] Assignee: Dow Corning Toray Silicone Co., Ltd., Tokyo, Japan

[21] Appl. No.: 234,212

[22] Filed: Apr. 28, 1994

[30] Foreign Application Priority Data

Apr. 27, 1993 [JP] Japan .................................. 5-123500

[51] Int. Cl.6 ............................................... C08K 5/54
[52] U.S. Cl. .............................. 524/265; 264/211.23; 264/211.24; 523/212; 523/213; 524/266; 524/588; 524/731
[58] Field of Search .................. 264/211.23, 211.24; 523/212, 213; 524/265, 266, 588, 731

[56] References Cited

U.S. PATENT DOCUMENTS

| | | |
|---|---|---|
| 4,649,005 | 3/1987 | Kobayashi et al. .................. 264/101 |
| 5,198,171 | 3/1993 | Kasahara et al. .............. 264/211.23 |

FOREIGN PATENT DOCUMENTS 56736 3/1989 Japan .
226157 8/1992 Japan .

*Primary Examiner*—Melvyn I. Marquis
*Attorney, Agent, or Firm*—William F. Boley

[57] ABSTRACT

The present invention relates to a method for the continuous preparation of heat-vulcanizing silicone rubber compounds. The method comprises continuous feeding of (A) 100 weight parts polydiorganosiloxane gum, (B) 5 to 100 weight parts reinforcing filler, and (C) up to 30 weight parts processing aid to a co-rotating twin-screw continuous compounding extruder. The components (A), (B), and (C) are continuously mixed in the extruder at a temperature in a range of about 200° C. to 300° C. The mixed components are then discharged, forming an extrudate. The extrudate is fed continuously to a counter-rotating twin-screw continuous compounding extruder, wherein the extrudate is continuously heat-treated at a temperature in a range of 150° C. to 300° C., forming the silicone rubber compound, which is then discharged from the counter-rotating twin-screw continuous compounding extruder.

10 Claims, 1 Drawing Sheet

METHOD FOR THE CONTINUOUS PREPARATION OF HEAT-VULCANIZING SILICONE RUBBER COMPOUNDS

BACKGROUND OF INVENTION

The present invention relates to a continuous method for the preparation of heat-vulcanizing silicone rubber compounds.

Heat-vulcanizing silicone rubber compounds comprised of polydiorganosiloxane gum, inorganic filler, and an optional processing aid are known as base compounds for the fabrication of silicone rubber moldings. Such heat-vulcanizing silicone rubber compounds are generally supplied by silicone producers to silicone rubber molding operations, where they are first blended with curing agent, typically an organoperoxide, and then molded or formed into silicone rubber moldings.

These heat-vulcanizing silicone rubber compounds have been prepared by the introduction of their constituent components into a large mixer equipped with two mixing blades (kneader mixer), followed by mixing while heating.

However, the high-productivity manufacture of a homogeneous, time-stable heat-vulcanizing silicone rubber compound by this prior preparative method is quite problematic. Specifically, the aforesaid prior preparative method frequently yields a silicone rubber compound that is very prone to plasticity retrogression (crepe hardening with elapsed time). Mixing for long periods of time while heating at high temperatures has been necessary in order to avoid this. For example, heating and mixing for 6 to 48 hours is necessary in order to prepare a homogeneous heat-vulcanizing silicone rubber compound that is free of time-dependent changes. In addition, there are limits on the ability to scale-up the kneader mixer itself.

Japanese Patent Application Laid Open [Kokai or Unexamined] Number Hei 2-102007 [102,007/1990] proposes a method for the continuous preparation of silicone rubber compounds in which the constituent components of a heat-vulcanizing silicone rubber compound are converted into a particulate mixture and this particulate mixture is then fed to a twin-screw continuous compounding extruder. This method, however, requires the execution of a complicated step in which the polydiorganosiloxane gum, inorganic filler, and processing aid are temporarily converted into said particulate mixture through the use of a means such as a high-speed mixer, etc. Thus, this method cannot be viewed as having an intrinsically excellent productivity.

The inventors achieved the present invention as a result of extensive research directed at solving the problems described above. The present invention takes as its object the introduction of a method for the continuous production of a time-stable heat-vulcanizing silicone rubber compound with excellent roll workability.

SUMMARY OF INVENTION

The present invention relates to a method for the continuous preparation of heat-vulcanizing silicone rubber compounds. The method comprises continuous feeding of (A) 100 weight parts polydiorganosiloxane gum, (B) 5 to 100 weight parts reinforcing filler, and (C) up to 30 weight parts processing aid to a co-rotating twin-screw continuous compounding extruder. The components (A), (B), and (C) are continuously mixed in the extruder at a temperature in a range of about 200° C. to 300° C. The mixed components are then discharged, forming an extrudate. The extrudate is fed continuously to a counter-rotating twin-screw continuous compounding extruder, wherein the extrudate is continuously heat-treated at a temperature in a range of 150° C. to 300° C., forming the silicone rubber compound, which is then discharged from the counter-rotating twin-screw continuous compounding extruder.

DESCRIPTION OF INVENTION

Figure 1:
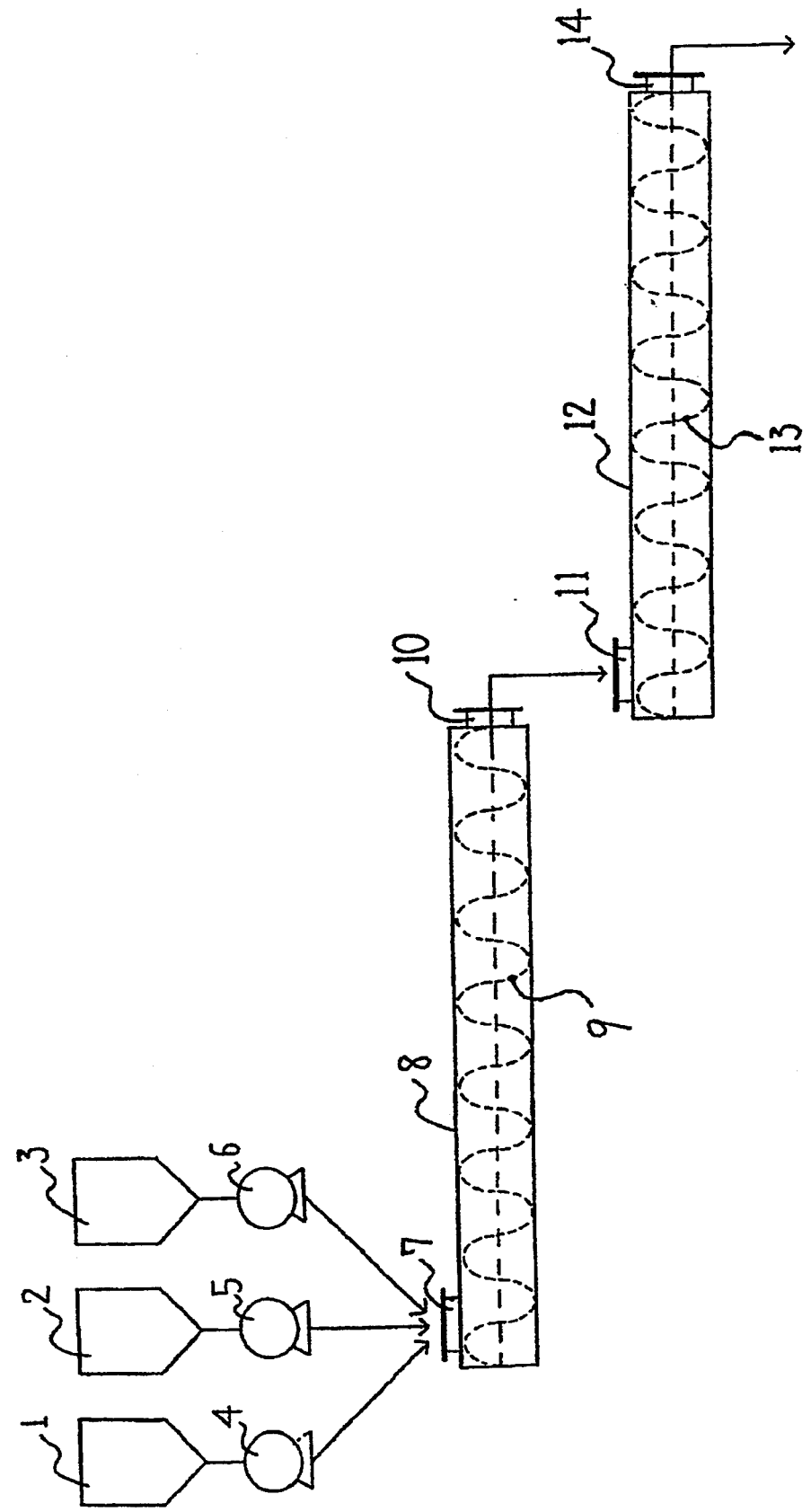
FIG. 1 is a schematic representation of one embodiment of the present method. Storage Tank 1 represents the storage tank for the component (A) polydiorganosiloxane, Storage Tank 2 represents the storage tank for the component (B) reinforcing filler, and Storage Tank 3 represents the storage tank for the component (C) processing aid. Pump 4 represents the polydiorganosiloxane feed pump, Pump 5 represents the reinforcing filler feed pump, and Pump 6 represents the processing aid feed pump. The components (A) through (C) are fed through Feed Opening 7 into Co-Rotating Twin-Screw Continuous Compounding Extruder 8, which includes Screw 9. The mixed components (A) through (C) are discharged out of the Co-Rotating Twin Screw Continuous Compounding Extruder through Discharge Orifice 10, forming an extrudate. The extrudate leaving Discharge Orifice 10 is fed through Feed Opening 11 into Counter-Rotating Twin-Screw Continuous Compounding Extruder 12, which includes Screw 13, to form the silicone rubber compound. The silicone rubber compound is then discharged from the Counter-Rotating Twin-Screw Continuous Compounding Extruder through Discharge Orifice 14.

The present invention relates to a method for the continuous preparation of heat-vulcanizing silicone rubber compounds, the method comprising:

(1) feeding continuously to a co-rotating twin-screw continuous compounding extruder
   (A) 100 weight parts polydiorganosiloxane gum,
   (B) 5 to 100 weight parts reinforcing filler, and
   (C) up to 30 weight parts processing aid;

(2) mixing continuously the components (A), (B), and (C) in the extruder at a temperature in a range of about 200° C. to 300° C.;

(3) discharging the mixed components, forming an extrudate;

(4) feeding the extrudate continuously to a counter-rotating twin-screw continuous compounding extruder;

(5) heat-treating the extrudate continuously in the counter-rotating twin-screw continuous compounding extruder at a temperature in a range of about 150° C. to 300° C. forming the silicone rubber compound; and (6) discharging the silicone rubber compound.

To explain this in greater detail, the component (A) polydiorganosiloxane gum used in the process of the present invention comprises a polydiorganosiloxane having a high degree of polymerization (DP), and at ambient temperature, having the consistency of raw rubber or gum.

This polydiorganosiloxane gum comprises those already known in the concerned art. The polydiorganosiloxane gum is an essentially linear polymer that is described by the following general formula $$R^1(R_2SiO)_nSiR_2R^1,$$

wherein each R is independently selected from a group consisting of substituted and unsubstituted monovalent hydrocarbon groups, with vinyl comprising 0 to 1.0% of said hydrocarbon groups; $R^1$ is a monovalent group selected from a group consisting of methyl, vinyl, phenyl, and hydroxyl; and n is a number with a value in a range of about 1,000 to 10,000. Examples of the non-vinyl R groups include alkyl groups, e.g., methyl, ethyl, propyl, butyl, hexyl, and octyl; cycloalkyl groups, e.g., cyclohexyl; aralkyl groups, e.g., 2-phenylethyl and 2-phenylpropyl; aryl groups, e.g., phenyl and tolyl; alkenyl groups, e.g., allyl and cyclohexenyl; and substituted hydrocarbon groups, e.g., chloromethyl and 3,3,3-trifluoropropyl. It is preferred that at least 50% of the R groups are methyl, from a consideration of heat resistance and so forth. When R contains 0% vinyl, $R^1$ is vinyl. When $R^1$ is not vinyl, at least 2 vinyl groups must be present among the R groups in each molecule. The viscosity of component (A) is preferably at least $1 \times 10^6$ centipoise at 25° C.

The reinforcing filler comprising the component (B) used in the process of the present invention may be any reinforcing filler heretofore used for silicone rubbers. Such reinforcing fillers are exemplified by reinforcing silicas whose surface area exceeds 50 m²/g, such as dry-method silicas and wet-method silicas, and by hydrophobicized silicas afforded by treating the aforesaid silica surfaces with an organosilicon compound such as polyorganosiloxane, organoalkoxysilane, organochlorosilane, and hexaorganodisilazane. Component (B) is to be added in a quantity in a range of about 5 to 100 weight parts per 100 weight parts component (A), preferably in a range of about 10 to 100 weight parts per 100 weight parts component (A).

The processing aid comprising component (C) of the process of the present invention is a component that is used on an optional basis in order to improve the dispersibility of the reinforcing filler comprising component (B), and to regulate the plasticity of the final silicone rubber compound. This processing aid comprises those processing aids heretofore known for use with silicone rubber compositions. Examples of this processing aid include dimethyldimethoxysilane, diphenylsilanediol, low-DP silanol-terminated dimethylpolysiloxane, low-DP silanol-terminated methylphenylpolysiloxane, and so forth. Component (C) is added in a quantity up to about 30 weight parts per 100 weight parts component (A), and is preferably in a range of about 1 to 20 weight parts per 100 weight parts component (A).

The heat-vulcanizing silicone rubber compound of the present invention is comprised of specific quantities of components (A), (B), and (C), as described above. However, various additives which are well-known in the concerned art may also be added to the heat-vulcanizing silicone rubber compound, insofar as the object of the present invention is not impaired. For example, the following types of additives may be added: heat-resistance improvers selected from the oxides, hydroxides, and fatty acid salts of various metals; flame retardants, e.g., platinum compounds and zinc carbonate; silicone rubber discoloration inhibitors, e.g., polymethylhydrogensiloxanes; internal mold-release agents, e.g., silicone oils and metal soaps; colorants; and so forth.

No specific restriction applies to the sequence of addition of components (A), (B), and (C), and any other optional components, in the execution of the process of the present invention, but the following process is generally useful.

In the process of the present invention, the aforesaid components (A), (B), and (C) are continuously fed to a co-rotating twin-screw continuous compounding extruder, where they are continuously mixed and discharged. Insofar as concerns the method for this, as shown in FIG. 1 components (A), (B), and (C) are continuously supplied from storage tanks 1, 2, and 3, respectively, through the action of feed pumps 4, 5, and 6, respectively, into a co-rotating twin-screw continuous compounding extruder 8, where they are continuously mixed and discharged through discharge orifice 10. This co-rotating twin-screw continuous compounding extruder contains two parallel, rotating screws within its barrel that synchronously rotate in the same direction.

The co-rotating twin-screw continuous compounding extruder useful in the present process has a screw rpm capacity of zero (at machine stop) to 1,000 rpm. The length/diameter (L/D) ratio for the extruder screw is not specifically restricted, but is preferably in a range of about 25 to 50 based on a consideration of such factors as the mixing efficiency for the compound. Parameters such as the screw construction and screw configuration may be selected as appropriate from commercial products; however, double-flighted and triple-flighted screws are preferred. Such twin-screw continuous compounding extruders are exemplified by the WP mixers from Werner and Pfleiderer GMbH, Stuttgart, FRG, the TEM mixers from Toshiba Kikai, Tokyo, Japan, and the PCM mixers from Ikegai Tekkou, Tokyo, Japan. This mixing is conducted at temperatures in a range of about 200° C. to 300° C.

The extrudate is then continuously introduced into a counter-rotating twin-screw continuous compounding extruder 12 through the feed opening 11 on said counter-rotating twin-screw continuous compounding extruder. The discharge orifice 10 of the co-rotating twin-screw continuous compounding extruder and the feed opening 11 of the counter-rotating twin-screw continuous compounding extruder are preferably connected under seal. The counter-rotating twin-screw continuous compounding extruder useful in this process contains two parallel, rotating screws within its barrel that rotate in different directions. This extruder can consist of a design in which the rotating screws of a co-rotating twin-screw continuous compounding extruder as used in the aforementioned first process are made to rotate in different directions. However, a useful L/D ratio of this extruder is in a range of about 5 to 15, and a useful screw rpm capacity of the extruder is in a range of about zero (at machine stop) to 15 rpm.

The flowrate of the silicone rubber compound discharging from the counter-rotating twin-screw continuous compounding extruder of the present invention is preferably 1/5 to 1/15 of the flowrate of the silicone rubber extrudate discharging from the co-rotating twin-screw continuous compounding extruder. There is a strong tendency for the time-dependent plasticity retrogression to occur at a flowrate greater than 1/5 as the result of an inadequate thermal aging. On the other hand, values less than 1/15 are economically unattractive because they require large equipment sizes.

The hot silicone rubber compound that is continuously discharged from the counter-rotating twin-screw continuous compounding extruder can be cooled by various methods. For example, it may be cooled using a two-roll mill, single-screw extruder, belt conveyor, and so forth.

The silicone rubber compound obtained as described above can be converted into silicone rubber by heating after the addition of a curing agent in the form of organoperoxide or a platinum compound plus an organohydrogensiloxane compound, for example, polymethylhydrogensiloxane.

EXAMPLES

The invention is explained in greater detail below through the following working examples. In the examples, parts indicates weight parts, the viscosity is the value at 25° C., and cP is an abbreviation for centipoise. The plasticity and plasticization recovery of the silicone rubber extrudates and compounds were measured by the following methods.

The plasticity was measured according to the method in JIS K 6300. The plasticization recovery was measured as follows. The silicone rubber extrudate or compound was first heated for 100 hours at 70° C., and 1.5 kg of the compound was then kneaded on a two-roll mill (diameter=8 inch) using a fast roll rotation of 25.2 rpm, a slow roll rotation of 18 rpm, and a roll gap of 1.5 mm. The number of seconds was measured until the compound had become wrapped around the fast roll.

EXAMPLE 1

The following were continuously supplied through the feed opening 7 of a co-rotating twin-screw continuous compounding extruder 8 (ZSK-58 from Werner and Pfleiderer Co.) from, respectively, polydiorganosiloxane gum storage tank 1, processing aid storage tank 3, and reinforcing filler storage tank 2: 100 parts dimethylvinylsiloxy-end-blocked dimethylsiloxane-methylvinylsiloxane gum (viscosity=$1\times10^7$ cP) composed of 99.8 mole % $(CH_3)_2SiO$ unit and 0.2 mole % $(CH_3)(CH_2=CH)SiO$ unit, 4 parts silanol-terminated dimethylpolysiloxane oil with average DP of 3 as processing aid, and 45 parts wet-method silica with a surface area of 230 $m^2/g$ (Nipsil LP from Nippon Silica Kougyo, Tokyo, Japan). Mixing was carried out on a continuous basis at 300 rpm and 230° C. at a discharge rate of 35 kg/hr. The silicone rubber extrudate (A) discharged from discharge orifice 10 on this extruder was continuously supplied through the feed opening 11 to a counter-rotating twin-screw continuous compounding extruder 12 (L/D=10), where it was mixed while heating to 250° C. at a flowrate which was one-eighth the flowrate of the co-rotating twin-screw continuous compounding extruder (the ratio between the silicone rubber compound flowrate for the counter-rotating twin-screw continuous compounding extruder and the silicone rubber extrudate flowrate for the co-rotating twin-screw continuous compounding extruder=1:8). The silicone rubber compound exiting discharge orifice 14 was cooled to room temperature to yield silicone rubber compound (B). The plasticity, plasticization recovery, and roll workability were measured on both silicone rubber extrudate (A) and silicone rubber compound (B).

A silicone rubber compound (C) was prepared under the same conditions as above, but in this case using a temperature of 330° C. in the co-rotating twin-screw continuous compounding extruder. A silicone rubber compound (D) was prepared under the same conditions as above, but in this case using a temperature of 180° C. in the co-rotating twin-screw continuous compounding extruder. Finally, a silicone rubber compound (E) was prepared under the same conditions as above, but in this case with the flowrate for the counter-rotating twin-screw continuous compounding extruder 1/20 of the flowrate of the co-rotating twin-screw continuous compounding extruder. The plasticity, plasticization recovery, and roll workability were measured on these silicone rubber compounds, and these results are reported in Table 1.

TABLE 1

|  | present invention | comparison examples | | | |
| --- | --- | --- | --- | --- | --- |
| silicone rubber extrudate/compound | B | A | C | D | E |
| plasticity (mm × 100) | 240 | 300 | 190 | 290 | 210 |
| plasticization recovery (seconds) | 20 | 70 | 20 | 50 | 20 |
| roll workability | excellent | poor | poor | poor | poor |

Silicone rubber compositions were also prepared by the addition with mixing to homogeneity on a two-roll mill of 0.5 parts 2,5-dimethyl-2,5-di(tert-butylperoxy)-hexane to 100 parts of each of the silicone rubber extrudate (A) and silicone rubber compounds (B) through (E) prepared as above. The resulting silicone rubber compositions were each compression molded at 170° C. for 10 minutes to give silicone rubber sheets (thickness=2 mm). The physical properties of these silicone rubber sheets were measured in accordance with JIS K 6301, "Physical Testing Methods for Vulcanized Rubbers", and these measurement results are reported in Table 2.

TABLE 2

| Physical Properties of the Cured Rubbers | | | | | |
| --- | --- | --- | --- | --- | --- |
|  | present invention | comparison examples | | | |
| silicone rubber extrudate/compound | B | A | C | D | E |
| hardness | 50 | 51 | 51 | 52 | 50 |
| tensile strength kgf/$cm^2$ | 90 | 90 | 80 | 85 | 80 |
| elongation, % | 350 | 340 | 325 | 340 | 310 |
| tear strength kgf/cm | 21 | 20 | 19 | 20 | 18 |

EXAMPLE 2

The following were continuously supplied through the feed opening 7 of a co-rotating twin-screw continuous compounding extruder 8 (ZSK-58 from Werner and Pfleiderer Co.) from, respectively, polydiorganosiloxane gum storage tank 1, processing aid storage tank 3, and reinforcing filler storage tank 2: 100 parts dimethylvinylsiloxy-end-blocked dimethylsiloxane-methylvinylsiloxane gum (viscosity=$1\times10^6$ cP) composed of 99.5 mole % $(CH_3)_2SiO$ unit and 0.5 mole % $(CH_3)(CH_2=CH)SiO$ unit, 10 parts silanol-terminated dimethylpolysiloxane oil with average DP of 3 as processing aid, and 45 parts dry-method silica with a surface area of 200 $m^2/g$ (Aerosil 200 from Nippon Aerosil Kabushiki Kaisha, Tokyo, Japan). Mixing was carried out on a continuous basis at 300 rpm and 250° C. at a discharge rate of 13 kg/hr. The silicone rubber extrudate (F) discharged from discharge orifice 10 on this extruder was continuously supplied through the feed opening 11 to a counter-rotating twin-screw continuous compounding extruder 12 (L/D=10), where it was mixed while heating to 250° C. at a flowrate one-fifth the flowrate for the co-rotating twin-screw continuous compounding extruder (the ratio between the silicone rubber compound flowrate for the counter-rotating twin-screw continuous compounding extruder and the silicone rubber extrudate flowrate for the co-rotating twin-screw continuous compounding extruder = 1:5). The silicone rubber compound exiting discharge orifice 14 was cooled to room temperature to yield silicone rubber compound (G). The plasticity, plasticization recovery, and roll workability were measured on both silicone rubber extrudate (F) and silicone rubber compound (G), and these results are reported in Table 3.

TABLE 3

|  | present invention | comparison example |
|---|---|---|
| silicone rubber extrudate/compound | G | F |
| plasticity (mm × 100) | 260 | 290 |
| plasticization recovery (seconds) | 20 | 60 |
| roll workability | excellent | poor |

Silicone rubber compositions were also prepared by the addition with mixing to homogeneity on a two-roll mill of 0.5 parts 2,5-dimethyl-2,5-di(tert-butylperoxy)-hexane to 100 parts of each of the silicone rubber extrudate (F) and compound (G) prepared as above. The resulting silicone rubber compositions were each compression molded at 170° C. for 10 minutes to give silicone rubber sheets (thickness=2 mm). The physical properties of these silicone rubber sheets were measured in accordance with JIS K 6301, "Physical Testing Methods for Vulcanized Rubbers", and these measurement results are reported in Table 4.

TABLE 4

|  | present invention | comparison example |
|---|---|---|
| silicone rubber composition | G | F |
| hardness | 50 | 55 |
| tensile strength kgf/cm$^2$ | 110 | 100 |
| elongation % | 500 | 350 |
| tear strength kgf/cm | 13 | 11 |

The preparative method in accordance with the present invention is characterized by the ability to continuously and rapidly prepare a silicone rubber compound that exhibits an excellent roll workability and extremely small time-dependent changes.

We claim:

1. A method for the continuous preparation of heat-vulcanizing silicone rubber compounds, the method comprising:

(1) feeding continuously to a co-rotating twin-screw continuous compounding extruder
        (A) 100 weight parts polydiorganosiloxane gum,
        (B) 5 to 100 weight parts reinforcing filler, and
        (C) up to 30 weight parts processing aid;
    (2) mixing continuously the components (A), (B), and (C) in the extruder at a temperature range of about 200° C. to 300° C.;
    (3) discharging the mixed components, forming an extrudate;
    (4) feeding the extrudate continuously to a counter-rotating twin-screw continuous compounding extruder;
    (5) heat-treating the extrudate continuously in the counter-rotating twin-screw continuous compounding extruder at a temperature in a range of about 150° C. to 300° C. forming the silicone rubber compound; and
    (6) discharging the silicone rubber compound.

2. A method according to claim 1, wherein component (A) has a viscosity of at least $1 \times 10^6$ centipoise at 25° C.

3. A method according to claim 1, wherein the quantity of component (C) is in a range of about 1 to 20 weight parts per 100 weight parts component (A).

4. A method according to claim 2, wherein the quantity of component (C) is in a range of about 1 to 20 weight parts per 100 weight parts component (A).

5. A method according to claim 4, wherein component (A) is a dimethylvinylsiloxy-endblocked dimethylsiloxanemethylvinylsiloxane gum.

6. A method according to claim 5, wherein component (C) is selected from a group consisting of dimethyldimethoxysilane, diphenylsilanediol, low-DP silanol-terminated dimethylpolysiloxane, and low-DP silanol-terminated methylphenylpolysiloxane.

7. A method according to claim 1, wherein the quantity of component (B) is in a range of about 10 to 100 weight parts per 100 weight parts component (A).

8. A method according to claim 6, wherein component (B) is a reinforcing silica having a surface area greater than 50 m$^2$/g, and the quantity of component (B) is in a range of about 10 to 100 weight parts per 100 weight parts component (A).

9. A method according to claim 1, wherein the flowrate of the silicone rubber compound discharging from the counter-rotating twin-screw continuous compounding extruder is in a range of about 1/5 to 1/15 of the flowrate of the extrudate discharging from the co-rotating twin-screw continuous compounding extruder.

10. A method according to claim 8, wherein the flowrate of the silicone rubber compound discharging from the counter-rotating twin-screw continuous compounding extruder is in a range of about 1/5 to 1/15 of the flowrate of the extrudate discharging from the co-rotating twin-screw continuous compounding extruder.

* * * * *